(12) United States Patent
Noda

(10) Patent No.: US 6,371,524 B1
(45) Date of Patent: Apr. 16, 2002

(54) SLIP-OUT PREVENTING APPARATUS FOR SLIDING TYPE JOINT MECHANISMS

(75) Inventor: Yuji Noda, Kusatsu (JP)

(73) Assignee: The Victaulic Company of Japan Limited, Tokyo (JP)

( * ) Notice: Subject to any disclaimer, the term of this patent is extended or adjusted under 35 U.S.C. 154(b) by 0 days.

(21) Appl. No.: 09/372,819

(22) Filed: Aug. 11, 1999

(51) Int. Cl.[7] ................................................ F16L 17/06
(52) U.S. Cl. ........................ 285/110; 285/379; 285/302
(58) Field of Search ................................. 285/110, 111, 285/302, 301, 379

(56) References Cited

U.S. PATENT DOCUMENTS

| | | | | |
|---|---|---|---|---|
| 2,672,356 A | * | 3/1954 | Crockett ...................... | 285/111 |
| 4,294,475 A | * | 10/1981 | Kanai et al. .................. | 285/302 |
| 4,611,827 A | * | 9/1986 | Marti et al. .................. | 285/301 |
| 4,838,582 A | * | 6/1989 | Hatakeyama et al. ....... | 285/110 |

FOREIGN PATENT DOCUMENTS

| | | | | |
|---|---|---|---|---|
| DE | 1094057 | * | 12/1960 | ................. 285/111 |
| WO | 94/24479 | * | 10/1994 | ................. 285/379 |

* cited by examiner

*Primary Examiner*—Teri Pham Luu
(74) *Attorney, Agent, or Firm*—Frishauf, Holtz, Goodman, Langer & Chick, P.C.

(57) ABSTRACT

A slip-out preventing apparatus for sliding type joint mechanisms, wherein packing members having lip portions in an opposed state and adapted to seal a clearance between a housing, which is fitted around outer surfaces of end portions of two tubular bodies to be joined together, and the same tubular bodies by utilizing a fluid pressure in the tubular bodies are provided on inner surfaces of both end portions of the housing, locking projections are formed on outer surfaces of both end portions of the housing with locking portions provided on the outer surfaces of the two tubular bodies, slip-out preventing covers being fitted fixedly around the tubular bodies so as to bestride and engage these locking portions and locking projections. In a joint mechanism having a housing which is provided with packing members therein, and which is in a slidable condition with respect to tubular bodies to be joined together, a slip-out of the housing from the end portions of the tubular bodies can be reliably prevented.

1 Claim, 3 Drawing Sheets

SLIP-OUT PREVENTING APPARATUS FOR SLIDING TYPE JOINT MECHANISMS

BACKGROUND OF THE INVENTION

This invention relates to a slip-out preventing apparatus for sliding type joint mechanisms, and aims at providing a new apparatus adapted to reliably prevent the occurrence of a slip-out of a housing from end portions of tubular bodies to be joined together in a joint mechanism, which housing is slidable with respect to the tubular bodies, provided with packings therein, and fitted fixedly around the tubular bodies.

A joint has been used generally for a long time as a means for connecting end portions of tubular bodies for distributing various kinds of fluids, and various types of joints have been employed. Regarding a joint by which two object tubular bodies are connected together in a fixed state, the tubular bodies or joint portions thereof are damaged due to the expanding and contracting movements, which are ascribed to the variation of an outside temperature and an effect of a flow of an inner fluid, of the tubular bodies, and, in view of the fact, connecting the tubular bodies to each other by a sliding type joint is carried out.

Namely, all of end portions of two tubular bodies to be joined together are merely inserted into packings provided in a joint member with these end portions not fixed to the joint member, whereby the fixing relation is not established between the tubular bodies and joint member. Such a structure can effectively deal with the expansion and contraction and the like, which are ascribed to the above-mentioned temperature variation in the four seasons, of the tubular bodies.

The conventional sliding type joint described above enables the expanding and contracting movements of the tubular bodies, i.e., it has the advantage of sufficiently allowing the expansion and contraction of the tubular bodies. However, when the power of such expanding and contracting movements of the tubular bodies is imparted in a multiple manner to the joint member, the possibility that displacement occurs in a concentrated manner to cause the tubular bodies to come off from the joint member becomes high. In such a case, the joint member cannot react satisfactorily to, especially, the subsidence and upheaval of ground in the district in which the tubular bodies are laid, so that the occurrence of accidents, such as the slip-out of the tubular bodies, leakage of water, damage to the sliding surfaces of the tubular bodies and distortion of conduits cannot be avoided.

SUMMARY OF THE INVENTION

The present invention has been achieved on the basis of repeated discussions about the solving of these problems encountered in the conventional techniques, as well as a success in suitably eliminating the disadvantages of the conventional techniques by providing special covers between a housing, which is provided so as to seal a clearance between two tubular bodies to be joined together, and these two tubular bodies, and it employs a slip-out preventing apparatus for sliding type joint mechanisms, wherein packing members having lips in an opposed state and adapted to seal the tubular bodies by utilizing a fluid pressure therein are provided on inner surfaces of both end portions of a housing fitted around outer surfaces of end portions to be joined together of the tubular bodies, to seal a clearance between the two tubular bodies, characterized in that outer surfaces of both end portions of the housing are provided with locking projections, outer surfaces of the tubular bodies to be joined together being provided with locking portions, the slip-out preventing covers being fixed to the tubular bodies so as to bestride the locking portions and locking projections, whereby the disadvantages of the above-mentioned prior art apparatus of this kind are eliminated.

DETAILED DESCRIPTION OF THE PREFERRED EMBODIMENTS

Figure 1:
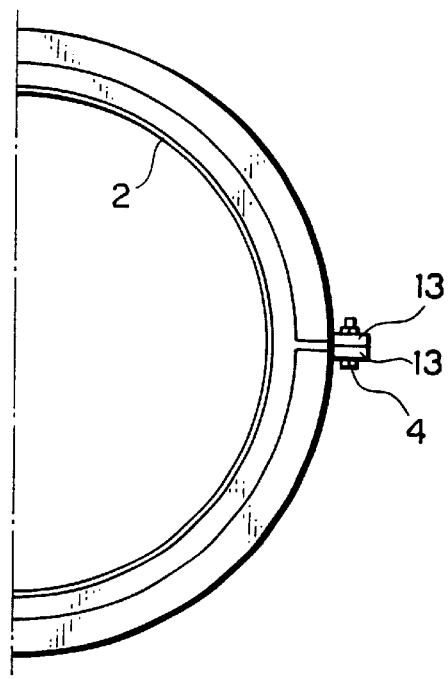
FIG. 1 is an end view showing a half portion of a mechanism in the present invention.
Figure 2:
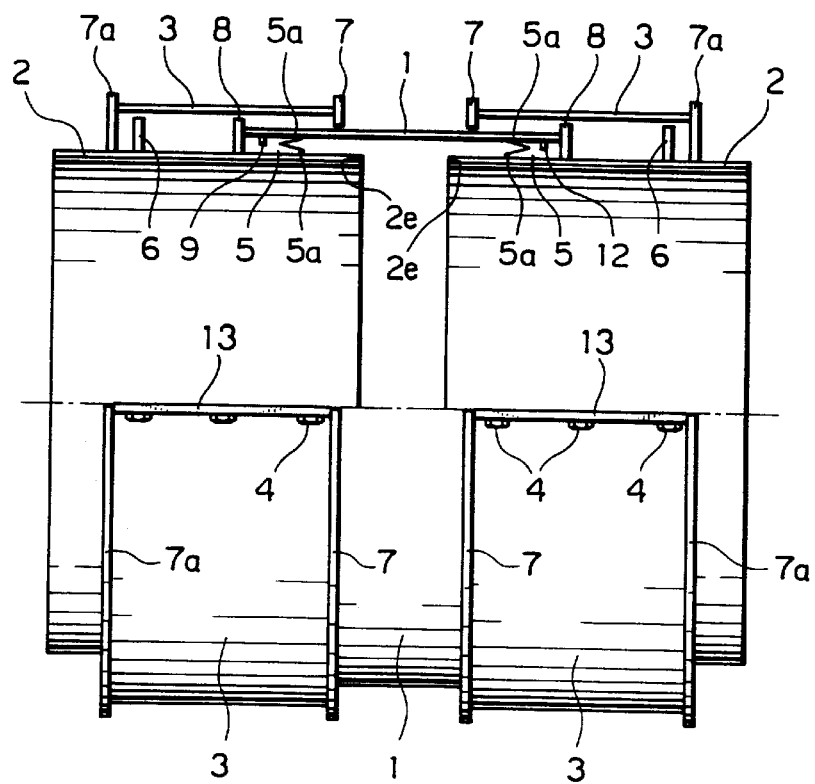
FIG. 2 is a sectioned side view showing the half portion shown in FIG. 1.

The details of the above-mentioned present invention will now be described. As shown in FIG. 1 which is a front view of a half of a general structure, and FIG. 2 which shows a side surface of a principal portion of the structure in a partially sectioned state, a housing 1 is fitted around outer surfaces of end portions of two tubular bodies 2, 2 to be joined together, and packing members 5 having lip portions 5a, 5a in an opposed state and adapted to seal the tubular bodies by introducing a fluid pressure in the tubular bodies onto the packing members are provided on inner surfaces of both end portions of the housing 1, locking members 12 shown in the partially enlarged views of FIGS. 3 and 4 being provided on the inner surface of the housing 1, the lip portions 5a, 5a which are engaged with the locking members 12 to retain the packing members 5, and which are provided in an opposed state on opened surfaces of the packing members 5, sealing a clearance between the tubular bodies 2 and housing 1 by utilizing the fluid pressure in the tubular bodies 2, 2. Such a joint system itself has heretofore been know generally as a sleeve type joint system.

Figure 6:
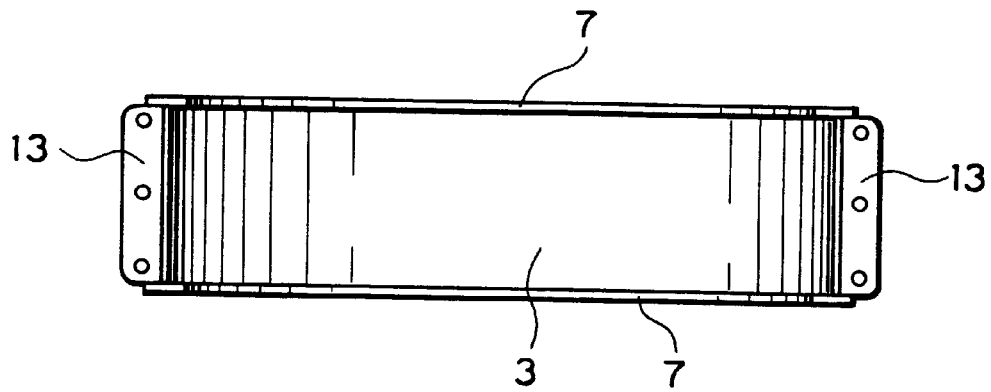
FIG. 6 is an inner view of the slip-out preventing cover according to the present invention.
Figure 7:
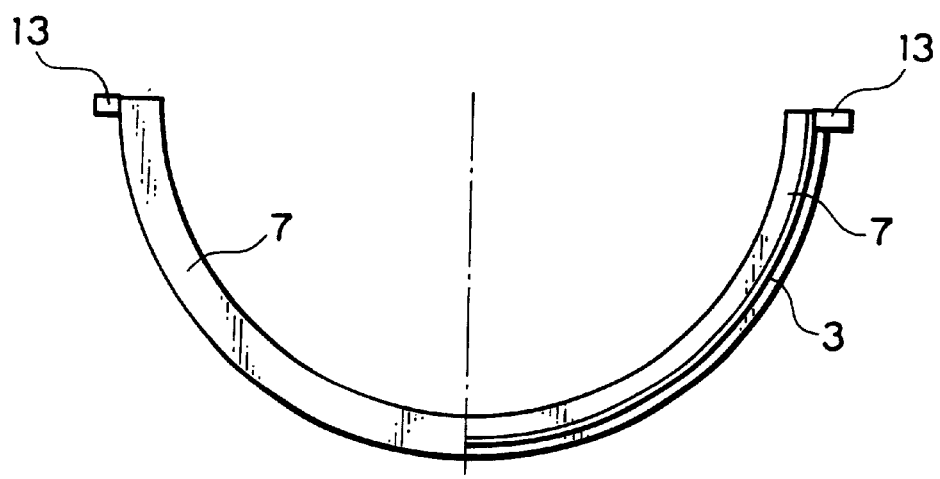
FIG. 7 is a partially sectioned side view of what is shorn in FIG. 6.
Figure 8:
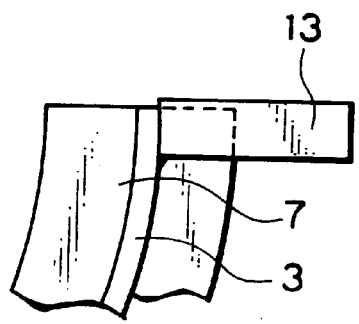
FIG. 8 is an enlarged explanatory view of a locking sea portion of what is shown in FIGS. 6 and 7.
Figure 9:
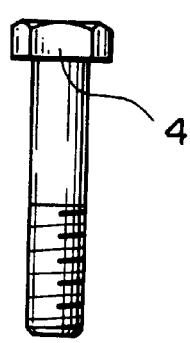
FIG. 9 is an explanatory view of a fastening means for the locking seat portion of what is shown in FIGS. 6–8.

According to the present invention, slip-out preventing covers 3 shown in FIGS. 6 and 7 are provided separately on both end portions of the housing 1 which is set on the tubular bodies so that the housing can be slid within the end portions of the tubular bodies 2, 2. The covers 3 formed as mentioned above, i.e., formed so as to have two divisional members 3, 3 are provided at both sides thereof with locking portions 7, 7 in an opposed state, and at axially extending divided end portions thereof with locking seat portions 13, 13 so that the locking seat portions project as shown in FIG. 8, the covers being fastened to each other at these locking seat portions 13, 13 by fastening means 4 shown in FIG. 9.

The slip-out preventing covers 3, 3 set in an opposed state on both sides of the housing 1 as described above are provided on both end portions thereof with first locking portions 7 adapted to be engaged with locking projections 8 formed on end portions of the housing 1, and second locking portions 7a adapted to be engaged with locking portions 6 provided on end-side portions of the tubular bodies 2 to be joined together, in such a manner that a distance between the first and second locking portions 7, 7a is shorter than that between the locking portions 6 and end portions 2e of the tubular bodies 2.

Figure 3:
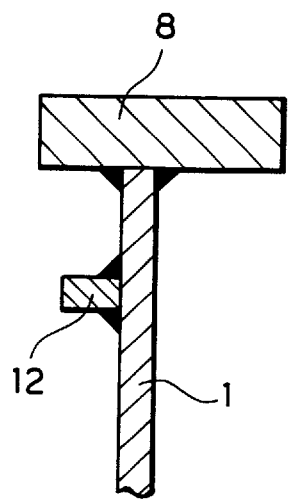
FIG. 3 is a partial sectional view showing the details of a support portion for retaining a packing between a tubular body to be joined to another in the present invention and a joint housing.
Figure 4:
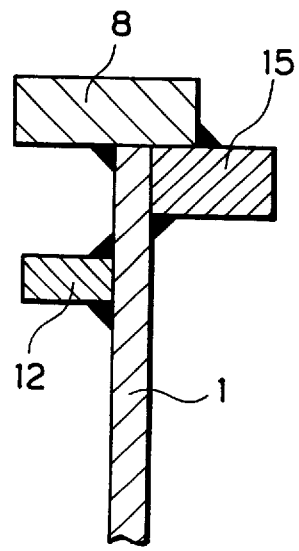
FIG. 4 is a partial sectional view similar to FIG. 3, showing a modified example of the support portion.
Figure 5:
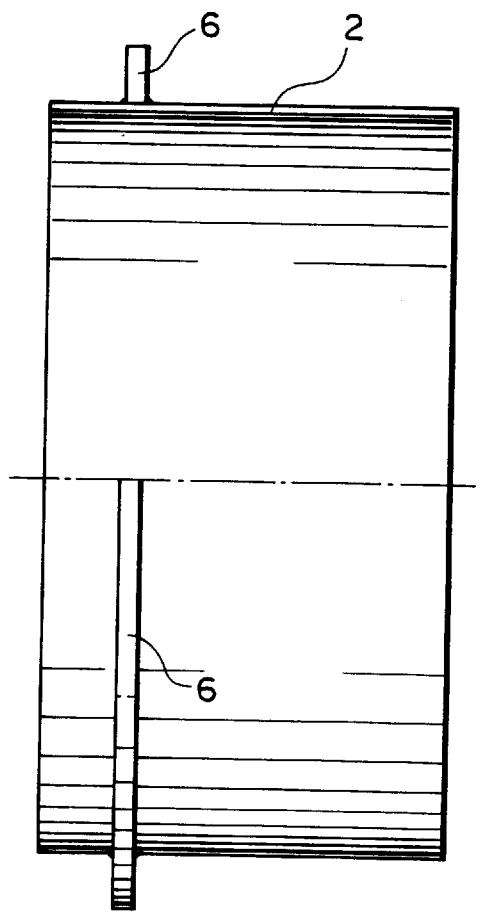
FIG. 5 is a sectional view showing a locking portion-fixing structure on an end portion of a tubular body to be joined to another.

The housing 1 described above is provided with the above-mentioned locking projections 8, and also projections 12 engaged with locking grooves 9 of the packing members 5 so as to stabilize the installed packing members 6 as shown in FIGS. 3 and 4. The locking projections 8 provided on the end portions of the housing 1 can be stabilized by fixing reinforcing members 15 thereto as shown in FIG. 4.

According to the present invention described above, which is directed to a structure wherein packing members are provided on the inner surfaces of both end portions of a housing fitted around the outer surface of end portions of two tubular bodies to be joined together, so as to seal a clearance between the housing and two tubular bodies, locking projections are formed on the outer surfaces of both end portions of the housing with locking portions provided on the outer surfaces of the tubular bodies to be joined together, slip-out preventing covers being fitted fixedly around the tubular bodies respectively so as to bestride and engage the locking portions and locking projections, whereby the tubular bodies to be joined together are connected to each other slidably, the tubular bodies being thereby expanded and contracted suitably to enable the damage to joint portions thereof to be avoided, and, moreover, the slip-out of the housing from such freely expandable and contractible tubular bodies to be suitably prevented, so that an effective and suitable connected condition of the tubular bodies is secured.

In the structure according to the present invention, first locking portions adapted to be engaged with the locking projections formed on the end portions of the housing, and second locking portions adapted to be engaged with the locking portions provided on the outer surfaces of the end-side portions of the tubular bodies to be joined together are provided on both end portions of the slip-out preventing covers so that a distance between the first and second locking portions is shorter than that between the locking portions on the tubular bodies and the opposed end portions of the tubular bodies, whereby the above-mentioned object of preventing the slip-out of the tubular bodies is reliably attained by the comparatively simple slip-out preventing covers.

According to the present invention described above, a stable transfer of a fluid can be attained by effectively preventing the slip-out of the tubular bodies in this kind of conduit mechanism as the mutually slidable connected relation of the tubular bodies joined together is secured. Therefore, the present invention is an invention of a large industrial effect.

What is claimed is:

1. A slip-out preventing apparatus for moveable joint tubular hollow bodies, said slip-out preventing apparatus comprising:

a housing fitted around outer surfaces of and portions of said joint tubular hollow bodies, slip-out preventing covers fixedly coupled around said joint tubular hollow bodies, and packing members having lip portions in an opposed state adapted to seal said joint tubular hollow bodies to be joined together by utilizing a fluid pressure inside said tubular bodies, said packing members being provided on inner surfaces of end portions of the housing so as to seal a clearance between said housing and said tubular bodies, wherein locking projections are formed on outer surfaces of end portions of said housing, said locking projections being provided on outer surfaces of said tubular bodies, wherein the slip-out preventing covers are fixedly coupled around said tubular bodies so as to astride and engage said locking portions with said locking projections, and wherein said slip-out preventing covers are provided at end portions thereof with first locking portions being adapted for engagement with said locking projections formed on the end portions of said housing and second locking portions being adapted to be engaged with said locking projections provided on the outer surfaces of the end portions of said housing so that a distance between said first and second locking portions is shorter than a distance between said locking portions on said tubular bodies and opposed end portions of said tubular bodies.

* * * * *